United States Patent [19]

Mazoyer et al.

[11] Patent Number: 5,900,268
[45] Date of Patent: May 4, 1999

[54] USE OF DEPOLYMERIZED CITRUS FRUIT AND APPLE PECTINS AS EMULSIFIERS AND EMULSION STABILIZERS

[75] Inventors: Jacques Mazoyer, Carentan; Jacky Leroux, Baupte; Gérard Bruneau, Mouans-Sartoux, all of France

[73] Assignee: SKW Biosystems, France

[21] Appl. No.: 08/819,662

[22] Filed: Mar. 12, 1997

[30] Foreign Application Priority Data

Mar. 15, 1996 [FR] France .................................. 96 03274

[51] Int. Cl.⁶ ...................................... A23L 1/222
[52] U.S. Cl. ........................... 426/654; 426/577; 426/602
[58] Field of Search ................................... 426/654, 577, 426/602; 536/2

[56] References Cited

U.S. PATENT DOCUMENTS 1,759,182  5/1930  Bender et al. .

FOREIGN PATENT DOCUMENTS 0 552 728     7/1993   European Pat. Off. .
1741723 A1    6/1992   U.S.S.R. .
   500281     2/1939   United Kingdom .
WO 94/27451  12/1994   WIPO .

OTHER PUBLICATIONS

Database Abstract AN73(04):HOS63 FSTA from Journal of Agricultural and Food Chemistry 1972 20(6) 1169–1173. Authors: Baker et al.

H. Graham. Food Colloids. Avi Publishing Company, Inc. Westport, CT. pp. 425–428, 1977.

Patent Abstracts of Japan; vol. 003, No. 087 (C–053); Jul. 25, 1979 (JP 54 062332 A) May 19, 1979 Database WPI Week 7926 1979 Derwent Publications Ltd., London, GB, AN 79–48051B (JP 54 062332 A).

Database WPI Section Ch, Week 9323, Derwent Publications Ltd., London, GB; Class D13, An 93–187488 XP0020165–07 (SU 1 741 723 A ; Food Ind Extramural Inst), Jun. 23, 1992.

Patent Search Report; FR 9603274; Oct. 22, 1996; Vuillamy, V.

Baker and Bruemmer, Pectinase Stabilization of Orange Juice Cloud, J. Agr. Food Chem. 20:1169–1173 (1972).

*Primary Examiner*—Anthony J. Weier
*Attorney, Agent, or Firm*—Fish & Richardson P.C.

[57] ABSTRACT

The invention relates to the use of depolymerized apple and citrus fruit pectins as emulsifiers and emulsion stabilizers. The depolymerized pectins have a molecular weight of less than 80,000 daltons and a viscosity in 2% aqueous solution of less than 80 cps, measured at 25° C. with a Brookfield viscometer.

Application: emulsifier for food emulsions.

12 Claims, 4 Drawing Sheets

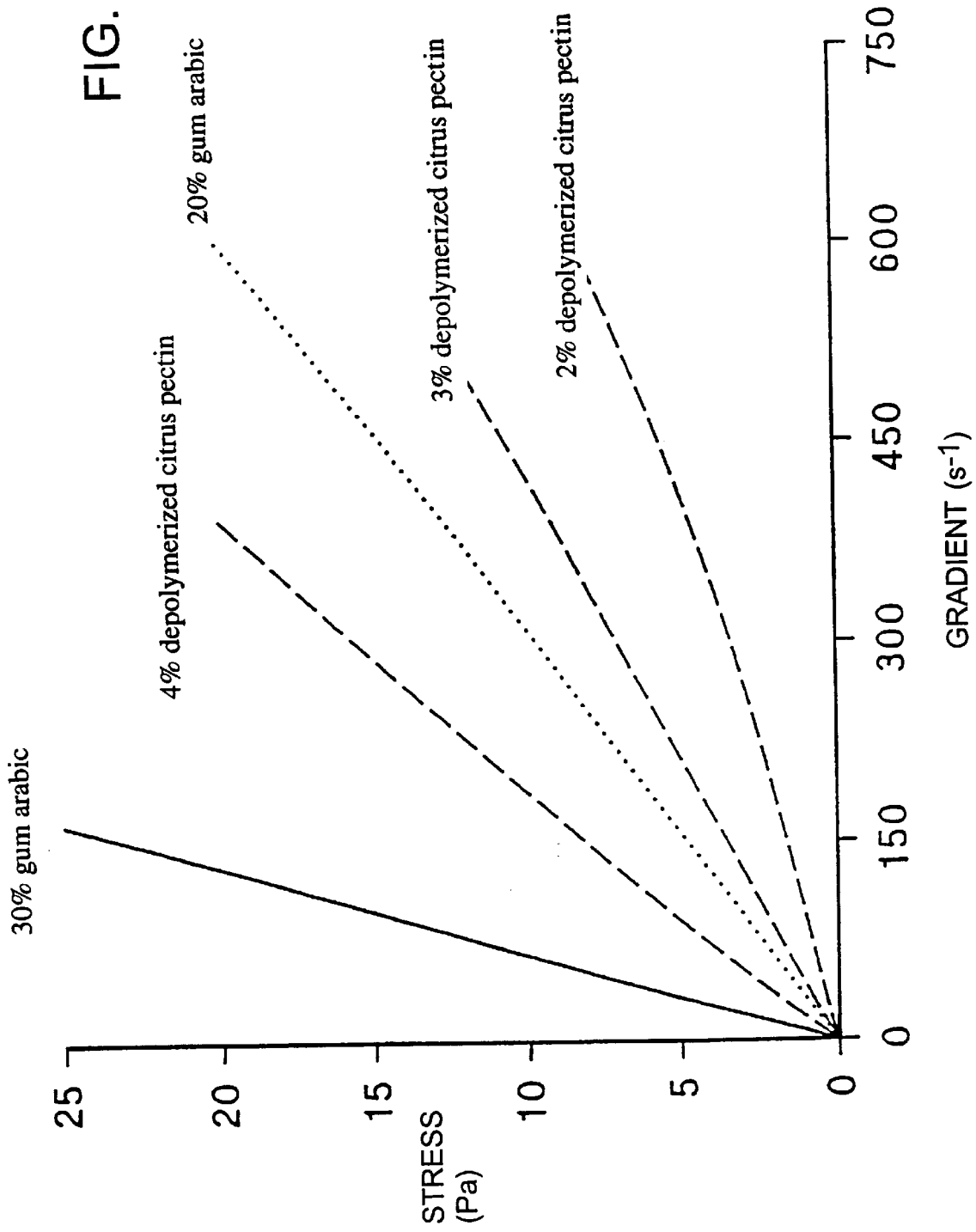

USE OF DEPOLYMERIZED CITRUS FRUIT AND APPLE PECTINS AS EMULSIFIERS AND EMULSION STABILIZERS

FIELD OF THE INVENTION

BACKGROUND OF THE INVENTION

The present invention relates to the use of depolymerized apple and citrus fruit pectins as emulsifiers and emulsion stabilizers, particularly in the food sector.

Pectins are polysaccharides which have been studied for their structure, their chemical properties and their physical properties.

More precisely, pectins are galacturonic acid polymers which are linked in the α1–4 position and are esterified to a greater or lesser degree by methanol.

They have been described in detail, especially by Claus ROLIN in chapter 10, pp. 257–293, of the work entitled "Industrial Gums" 3rd edition, published by Roy L. Whistler and James N. Bemiller.

There are two distinct classes of pectins: pectins with a high degree of methylation, or "HM pectins", in which at least 50% of the galacturonic acid groups are esterified, and pectins with a low degree of methylation, or "LM pectins" in which fewer than 50% of the galacturonic acids are esterified. In some cases the secondary alcohol groups of the pectins can also carry acid groups, examples being acetyl groups or feruloyl groups. Neutral sugars can also be present on the polysaccharide chain; for example, rhamnose can be inserted in the chain whereas other sugars, such as arabinose, galactose or xylose, can be grafted on as side chains.

Pectins are generally extracted from the walls of plants and more particularly from citrus fruit rind and apple marc. The extraction process generally consists of:

1) an acid or basic treatment, which solubilizes the pectin;
2) then a purification to separate the pectin in solution from the solid residues;
3) and separation of the pectin from its solvent by precipitation with alcohol or by other methods of precipitation or water removal.

The extraction conditions are generally chosen for maximum preservation of the molecular weight of the pectins; a hydrolysis is thus generally carried out at temperatures varying from 50 to 99° C. and at pH values varying from 1 to 3 for periods varying from a few minutes to several hours.

The molecular weight of the resulting pectins is generally greater than 80,000 daltons.

The physical properties of pectins are generally linked to their high molecular weight and their degree of methylation; pectins are thus gelling agents in more or less water-impoverished media and they combine with the casein in milk to stabilize the milk in acid media. Consequently there is a field of application centered around gelling in sugar-based media jams/marmalades, toppings, crystallized fruits, baking jams, etc.) and in milk-based media (custard tarts, sour milk drinks, etc.).

It has also been proposed to use pectins as emulsifiers (see Chemical Abstracts vol. 28, no. 2808, 1934, and vol. 64, no. 8855, 1966, and U.S. Pat. No. 1,759,182).

Among the pectins, those derived from sugarbeet are known to have good emulsifying and stabilizing properties at the same time.

Sugarbeet pectins differ from other pectins, especially citrus fruit or apple pectins, in that they contain a considerable number of acetyl groups, which inhibit the pectin gelling phenomenon.

On the other hand, the presence of these acetyl groups gives these pectins valuable surface-active properties, enabling them to be used as emulsifiers and emulsion stabilizers. In this connection, reference may be made to the article by I.C.M. DEA et al. in "Food Hydrocolloids", vol. 1, no. 1, pp. 71–88, 1986, and to the article by Nissim GARTI in "Food Structure", vol. 12, 1993, pp. 411–426.

EP-A1-0 426 434 also refers to the difference between sugarbeet pectins and other pectins and describes low molecular sugarbeet pectins which have emulsion stabilizing properties.

SUMMARY OF THE INVENTION

It has now been found, surprisingly, that depolymerized citrus fruit and apple pectins possess excellent emulsifying and stabilizing properties at very much smaller doses than those generally used with gum arabic.

These properties are all the more surprising because citrus fruit and apple pectins are practically devoid of acetyl groups (less than 0.8% whereas beet pectin contains 4%).

Thus the present invention relates to the use of citrus fruit and apple pectins as emulsifiers and emulsion stabilizers.

In the present description "emulsifier" denotes a compound which possesses a surface-active power towards polyphase systems of the oil-in-water type, and "stabilizer" denotes a compound which is capable of stabilizing an oil-in-water emulsion against coalescence.

DETAILED DESCRIPTION

The depolymerized citrus fruit and apple pectins which are advantageously suitable for the purposes of the invention are those with a molecular weight of less than 80,000 daltons and preferably of between 10,000 and 50,000 daltons. Such molecular weights no longer allow the pectins to form cohesive gels and to meet the conventional use requirements of pectins.

The viscosity of aqueous solutions of these depolymerized pectins, measured with a BROOKFIELD viscometer at 60 rpm, at a concentration of 2% and at 25° C., is less than 80 cps, preferably between 5 and 50 cps and particularly preferably between 5 and 20 cps, whereas the viscosity of aqueous solutions of corresponding non-depolymerized pectins, or base pectins, measured under the same conditions, is always greater than 50 cps, often greater than 80 cps, and can vary according to the origin and chemical characteristics of the pectin. The rheological behavior of depolymerized pectins is Newtonian, whereas that of base pectins is pseudo-plastic.

The surface-active properties of the depolymerized pectins which can be used according to the invention are analogous to those of gum arabic, as will be demonstrated below.

The pectins can be depolymerized by any chemical or physical treatment capable of reducing the degree of polymerization.

Examples of appropriate treatments are indicated below:

acid hydrolysis treatment, ultrasound treatment, gamma ray treatment, mechanical degradation treatment by means of shear, β-elimination treatment with an alkaline base, oxidative depolymerization using oxidizing reagents such as oxygen, chlorine, chlorite, hypochlorite, hydrogen peroxide, Fenton's reagent, etc., enzymatic or microbial degradation or any other chemical or physical treatment which results in a reduction in the molecular weight of the pectin.

These processes are well known to those skilled in the art and are described for example by W. H. Van Deventer-Schriemer and W. Pilnik in ACTA ALIMENTARIA, vol. 16(2), pp. 143–153 (1987).

Acid hydrolysis treatment, which is the preferred process, is described in detail below.

In this process, the base material generally used to obtain pectins, namely citrus fruits and apples, is first treated with a dilute acid (selected from strong mineral acids like HCl, $HNO_3$, $H_2SO_4$ and $H_3PO_4$) in a sufficient amount to bring the pH to between 1 and 3, at a temperature between 50 and 99° C. and preferably 75 to 85° C., for periods varying from a few minutes to several hours, preferably between 30 and 120 min, and under mechanical shear. The pectin solubilized in this way is then subjected to a heat treatment, which consists for example in raising the temperature of the solution to between 100 and 130° C., preferably to 120° C., and maintaining this temperature for a few minutes, preferably from 5 to 15 min. The "degraded" pectin which results is then separated from the suspension by centrifugal decantation and/or by filtration with an aid (perlite, diatomaceous earth, cellulose, etc.). The purified pectin is concentrated by ultrafiltration or by evaporation before being precipitated in alcohol (or by metal salts) or before being directly dried after sufficient concentration. The resulting depolymerized pectin is then dried and ground.

The process described above is a high temperature acid hydrolysis treatment. It is also possible to choose slower or faster degradation conditions, for example a treatment of a few hours at temperatures below 100° C. or rapid conditions of a few minutes or a few seconds at temperatures above 100° C.

The degradation of the pectin can also be effected at other stages of the manufacturing process, for example on the concentrate, on the precipitate or on the powder, which can be treated directly or after redissolution or resuspension in a non-solvent. The degradation treatment can also be carried out directly on the starting material.

For reasons yet to be explained, reducing the molecular weight of citrus fruit and apple pectins develops their emulsifying and stabilizing power.

This has been demonstrated by the following measurements:

measurements of interfacial and surface tensions, measurements of the size of the oil globules, and application tests.

Depolymerized citrus fruit and apple pectins, characterized by a low viscosity enhancing power and a higher surface-active power towards polyphase systems of the oil-in-water type, can thus be employed in fields of application where gum arabic is generally used, namely drinks, emulsions for soft drinks, soft drinks, syrups, atomized flavoring carriers, sorbets, sauces, bread products, confectionery, etc., and at lower use doses.

Furthermore, depolymerized citrus fruit and apple pectins can also be associated with one or more other polymers of higher molecular weight which have a higher viscosity enhancing power, making it possible to limit the phenomena of creaming in some cases. These other polymers can be selected from the range of natural or modified hydrocolloids such as, for example, pectins, xanthan and gellan gums, alginate, guar, carob, carrageenans, starch and its esters and ethers, cellulose and its esters and ethers, gelatin, etc.

The pectins according to the invention can therefore be applied as emulsifiers throughout the range of prepared food emulsions such as, for example, margarines, lightened butters, salad dressings, ice creams, sorbets, cereal products, creams, mousses, cheeses, chocolates, meat emulsions, meat and fish mousses, toffees and other confectionery, snack foods, etc.

Their use is particularly suitable for stabilizing essential oil emulsions and mainly emulsions for soft drinks, soft drinks, syrups and emulsified or atomized flavorings.

The invention will now be described in greater detail by means of the nonlimiting Examples below after a brief description of the drawings.

Brief Description of Drawings

FIG. 2 is a plot of stress versus gradient for the flow properties of 30% gum arabic, 4% depolymerized citrus pectin, 20% gum arabic, 3% depolymerized pectin, and 2% depolymerized pectin;

EXAMPLE 1

Depolymerized Citrus Pectin

A—PREPARATION

Figure 1:
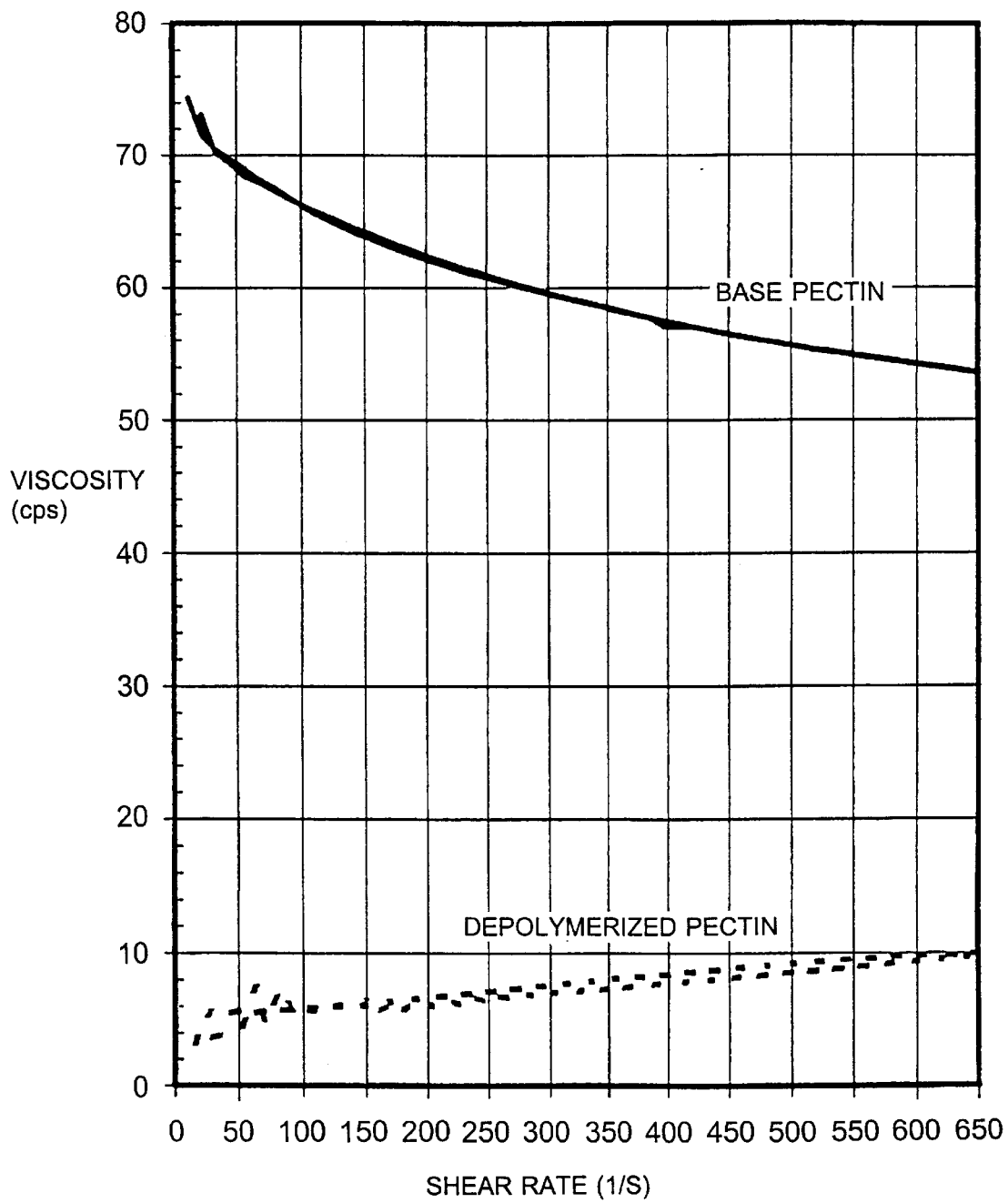
FIG. 1 is a plot of viscosity versus shear rate for base pectin and for depolymerized pectin according to step A) of Example 1.

Citrus rinds were dispersed in distilled water at 80° C. for 15 minutes. The concentration of rinds in the resulting dispersion was 50 g/l.

Nitric acid ($^-$7N) was added in a sufficient amount to bring the pH to 1.6.

The suspension was heated at 80° C. for 60 minutes in a watertight agitated vat and the temperature was then raised to 120° C. and maintained for 10 minutes.

After cooling to 80° C., the insoluble materials were filtered off.

The clear filtrate was then precipitated in two volumes of isopropyl alcohol acidified to pH 3.3 with nitric acid.

The precipitate was recovered by filtration on Tergal cloth and washed with isopropanol before being dried.

B—DETERMINATION OF THE MOLECULAR WEIGHT

The propeller turbine of an IKA-WERK RW20 mechanical agitator was immersed in a 250 ml beaker containing 100 g of deionized water and agitation was started at a speed of rotation of 1000 rpm. 300 mg of the pectin obtained in section A) were then poured onto the vortex and agitation was maintained for 1 h 15 min.

100 ml of 0.2M $LiNO_3$ solution containing 2 g/l of ethylenediaminoacetic acid were added to the solution obtained above. Agitation was continued for a few minutes and an aliquot was filtered on a 0.2 μm Whatman Anotop 25 filter fitted to a 10 ml syringe.

The filtered solution was injected into a 100 μl loop of a high performance liquid chromatograph equipped with two TSK GMP WXL columns in series. Elution was carried out with 0.1M $LiNO_3$ solution containing 1 g/l of EDTA, pH 7, at 0.6 ml/min and at 60° C. and detection was effected with an R1 ERC 7510 refractive index detector.

The molecular weight was determined by light scattering with a MALLS detector from WYATT DAWN.

It was thus determined that the molecular weight of the pectin obtained by the procedure described in section A) was between 20,000 and 40,000 daltons.

C—MEASUREMENT OF THE VISCOSITY

The blade of an IKA-WERK RW20 mechanical agitator, equipped with a propeller turbine of diameter 50 mm, was immersed in a 250 ml beaker containing 150 g of deionized water and agitation was started at a speed of rotation of 1000 rpm.

4.0 g of the pectin obtained in A) were dispersed onto the vortex. Agitation was continued for 20 to 30 minutes until the solution was homogeneous.

The weight of the solution was adjusted to 200 g by the addition of water. Agitation was continued for a few minutes and the beaker was placed in a water bath at 25° C.

After the temperature had stabilized at 25° C., the viscosity of the solution was measured with a Brookfield Synchrolectric model LVT viscometer at 60 rpm using the no. 1 or 2 spindle, depending on the viscosity.

The viscosity of the pectin was 5 to 10 cps.

The viscosity of a 2% aqueous solution of the base citrus pectin (non-depolymerized citrus pectin) was measured under the same conditions. This viscosity was of the order of 60 to 70 cps and that of a 20% solution of gum arabic was 30 cps.

The flow characteristics of the two pectins were determined by measuring the viscosity in cps as a function of the shear rate.

The results obtained are plotted on the graph of FIG. 1, in which the viscosity in cps is on the ordinate and the shear rate $(S^{-1})$ is on the abscissa; the continuous line corresponds to the base pectin and the broken line corresponds to the depolymerized pectin obtained according to A).

EXAMPLE 2

Emulsifying and Stabilizing Power of the Pectin of Example 1

A—MEASUREMENT OF THE INTERFACIAL TENSIONS AND SURFACE TENSIONS a) Interfacial tensions A 2% pectin solution was prepared as described for measurement of the viscosity, except that the water was replaced with 0.02M citrate buffer, pH 3.8, stabilized with 1.3 g/l of sodium benzoate. This solution was thermostated at 25° C. in a water bath.

The solution was then filtered on a Millipore XX 1004730 glass filter equipped with a type AP 2504700 glass microfiber prefilter.

70 ml of this solution were placed in a crystallizing dish of internal diameter 68 mm and height 40 mm (ref. Pyrex 1470/02 D).

The crystallizing dish was placed on the platform of a Du Nouy ring tensiometer (ref. CSC no. 70535) and the ring was immersed below the surface of the liquid.

Using a model 3100 Nichiryo pipette equipped with a tip, 40 ml of paraffin oil thernostated at 25° C. were discharged onto the surface of the liquid. This addition was performed very slowly so as not to mix the two phases.

The interface was left to stabilize for a few minutes and then the tension was measured by raising the ring above the interface until the interfacial film ruptured.

The interfacial tensions of 2% solutions of non-depolymerized pectins and those of a 20% solution of gum arabic were also measured under the same conditions.

The results obtained are shown in Table I below.

b) Surface tensions

Using a Du Nouy no. 70535 ring tensiometer from CSC SCIENTIFIC COMPANY, Inc., the surface tension of a 2% aqueous solution of the pectin obtained in Example 1A), buffered to pH 3.2, was measured by the procedure described in section a) for determination of the interfacial tensions, but without the addition of paraffin; the measurement was made at the water-air interface.

The surface tension of 2% aqueous solutions of non-depolymerized citrus and apple pectins and the surface tension of a depolymerized apple pectin obtained by the procedure described in Example 1 were also measured under the same conditions.

Likewise, the surface tension of a 20% aqueous solution of gum arabic was measured under the same conditions.

The results obtained, which are collated in Table I below, show that the surface tension of the depolymerized citrus pectin and the depolymerized apple pectin is similar to that of a 20% solution of gum arabic.

TABLE I

| PRODUCT | Molecular weight (daltons) | DE* (%) | GA** (%) | SURFACE TENSION (dynes/cm) | INTER-FACIAL TENSION (dynes/cm) |
|---|---|---|---|---|---|
| Depolymerized citrus pectin | 24,600 | 63.3 | 80 | 52.4 | 22.3 |
| Depolymerized citrus pectin | 36,500 | 66.3 | 81.5 | 43.2 | 18.1 |
| Citrus pectin | 111,600 | 66.4 | 81.3 | 59.2 | 28.3 |
| Citrus pectin | 140,200 | 70.5 | 82.1 | 61.9 | 35.2 |
| Citrus pectin | 111,900 | 60.3 | 85 | 61.8 | 30.2 |
| Citrus pectin | 101,400 | 60.4 | 83.6 | 59.9 | 27.6 |
| Citrus pectin | 165,000 | 72.9 | 79 | 61.8 | 32.1 |
| Citrus pectin | 119,400 | 64.9 | 83 | 68 | 38.6 |
| Citrus pectin | 121,600 | 70.1 | 81.5 | 53.4 | 28.2 |
| Apple pectin | 120,800 | 67.1 | 63.7 | 56.2 | 30 |
| Depolymerized apple pectin | 13,000 | 66.3 | 66.3 | 45.4 | 20.6 |
| Apple pectin | 159,000 | 75.1 | 54.7 | 70.5 | 39.9 |
| Apple pectin | 97,700 | 63.8 | 74.5 | 63.1 | 33.5 |
| Apple pectin | 109,700 | 62.3 | 73.2 | 54.2 | 33.3 |
| Apple pectin | 186,300 | 74.6 | 40.4 | 59.6 | 33 |
| Gum arabic |  |  |  | 47.3 | 19.7 |

*DE: Degree of esterification determined as indicated below
**GA: Galacturonic acid content determined as indicated below

B—MEASUREMENT OF THE DEGREE OF ESTERIFICATION AND THE GALACTURONIC ACID CONTENT

The degree of esterification (DE) of pectin is the number of esterified carboxyl groups per 100 equivalents of galacturonic acid. The galacturonic acid content (GA) is the weight of galacturonic acid (MW 194.1) per 100 g of crude sample.

These measurements are made in two stages:
1—Determination, by titration, of the amount of free acid.
2—Determination, by titration, of the amount of acid freed after saponification.

About 0.500 g of the pectin sample is weighed out. The powder is transferred quantitatively to a 250 ml conical flask and moistened with 2 ml of isopropanol, and 120 ml of deionized water are added. The mixture is stirred with a magnetic stirrer until everything has dissolved. 10 g of a mixture of Amberlite® IR200 and IRA410 ion exchange resins (3 vol and 5 vol respectively) are added. Stirring is maintained for 15 min and the mixture is then filtered under vacuum on a Millipore AP 2504700 glass microfiber filter mounted on an XX 1004730 support fixed to a 500 ml vacuum flask. The solution is transferred to a 500 ml conical flask and the resin, filter and flasks are rinsed with about 100 ml of freshly boiled deionized water. 4 or 5 drops of bromothymol blue solution (0.5 g of bromothymol blue, 20 ml of 95 vol % ethyl alcohol, 80 ml of deionized water) are added and the mixture is titrated with 0.1N sodium hydroxide (giving a volume V1). 100 ml of 0.1N sodium hydroxide are added, the flask is stoppered and stirring is maintained for 1 hour at room temperature. 100 ml of 0.1N hydrochloric acid and 2 or 3 drops of bromothymol blue solution are added and the mixture is titrated with 0.1N sodium hydroxide (giving a volume V2). The degree of esterification and the galacturonic acid content are then calculated using the following formulae:

$$DE(\%) = 100 \times \frac{V1}{V1 + V2}$$

$$GA(\%) = \frac{V1 + V2}{m} \times 194.1,$$

where V1 and V2 are in ml m is in g.

C—FLOW PROPERTIES

The flow properties of 2, 3 and 4% solutions of the pectin obtained in Example 1A) were determined as follows:

2, 3 and 4% w/w solutions of depolymerized citrus pectins were prepared in 0.02M citrate buffer, pH 3.8, stabilized with 1.3 g/l of sodium benzoate. The turbine of an IKA-WERK RW20 mechanical agitator was immersed in a tared 250 ml beaker containing 150 g of citrate buffer and agitation was started at 1000 rpm. Appropriate amounts of depolymerized citrus pectin and gum arabic powders were dispersed onto the vortex and agitation was maintained until everything had dissolved.

The weight of the beaker was adjusted to the weight of the tare +200 by the addition of buffer. The beakers were then covered with a plastic film and stored in a water bath at 20° C. The flow curve was measured with a Carri-Med CSL 100 rheometer from RHEO, the measuring system being a plane cone (diameter of the cone 6.0 cm, angle 3'58") and the gap being 127 μm. The stress was swept in linear variations between 0 and 25 N/m² over a rise of 10 min and a fall of 10 min. The resultant velocity gradient was recorded for each value of the applied stress.

The flow properties of a 20% solution of gum arabic were determined under the same conditions.

The results obtained are shown on the graph of FIG. 2, in which the stress expressed in Pa is on the ordinate and the gradient expressed in $s^{-1}$ is on the abscissa.

It is seen that the flow properties of depolymerized citrus pectin are totally analogous to those of gum arabic. Both these products are of Newtonian character, as shown in FIG. 2. Thus the use concentration of depolymerized pectin can reach values of 4% without exceeding the flow characteristics of 30% gum arabic.

D—MEASUREMENT OF THE SIZE OF THE OIL GLOBULES

The depolymerized citrus pectin obtained according to Example 1A) has stabilizing properties which make it possible to stabilize the emulsion against coalescence, as demonstrated below by measurement of the size of the oil globules with a laser granulometer according to the technique described by M. TERRAY et al. in Bios Boissons, 26th annual volume, January–February 1995 - no. 252.

The size of the oil globules was measured in emulsions containing 4% by weight of essential orange oil, the aqueous phase being buffered to pH 3.8 and containing X % of the test pectin or gum arabic. The emulsion was produced by passing the essential oil/aqueous phase mixture through a Warring Blendor for 3 min. The mean size of the globules was measured with a Malvern mastersizer laser granulometer after 1, 4, 7 or 14 days of storage. The mean diameters of the globules in micrometers, given in Table II, show that the depolymerized citrus pectin makes it possible to obtain an emulsion which is as fine and stable as that obtained with gum arabic.

TABLE II

|  | D = 0 | D = 1 | D = 4 | D = 7 | D = 14 |
|---|---|---|---|---|---|
| 20% gum arabic | 1.1 |  |  |  | 1.3 |
| 30% gum arabic | 0.9 |  |  |  | 1.2 |
| 2% pectin of Example 1A) | 1.3 | 1.2 |  | 1.2 | 1.2 |
| 3% pectin of Example 1A) | 1.1 |  | 1.1 |  |  |
| 4% pectin of Example 1A) | 1.0 |  | 1.0 |  |  |
| 2% base pectin | 3.3 | 3.0 |  | 3.7 | 3.3 |
| 3% base pectin | 1.8 |  | 5.6 |  |  |
| 4% base pectin | 1.6 |  | 5.1 |  |  |

Figure 3A:
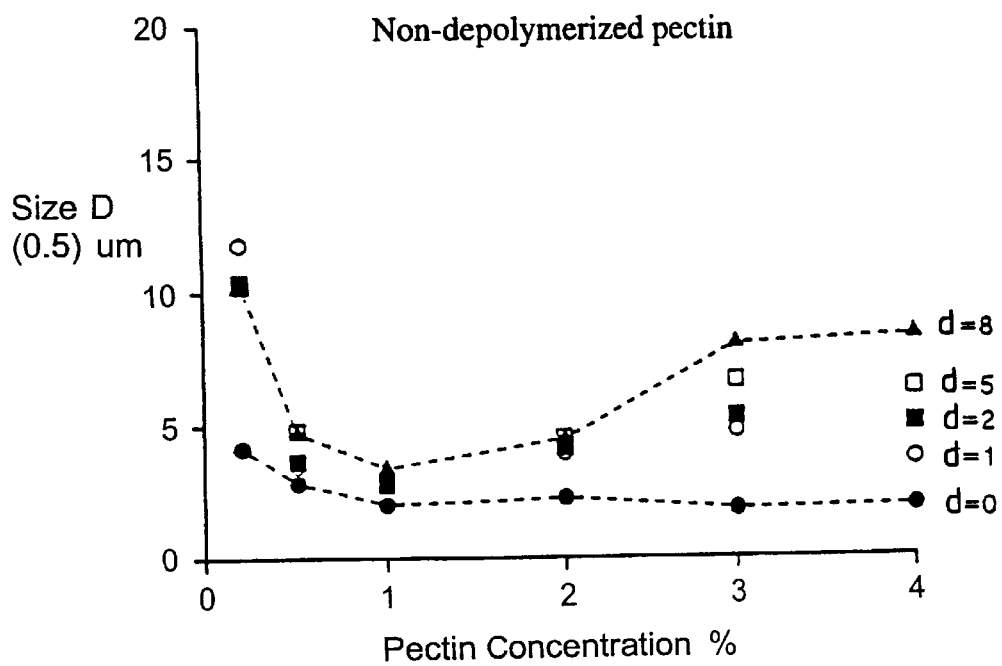
FIG. 3A is a plot of globular size as a function of concentration of non-depolymerized pectin.
Figure 3B:
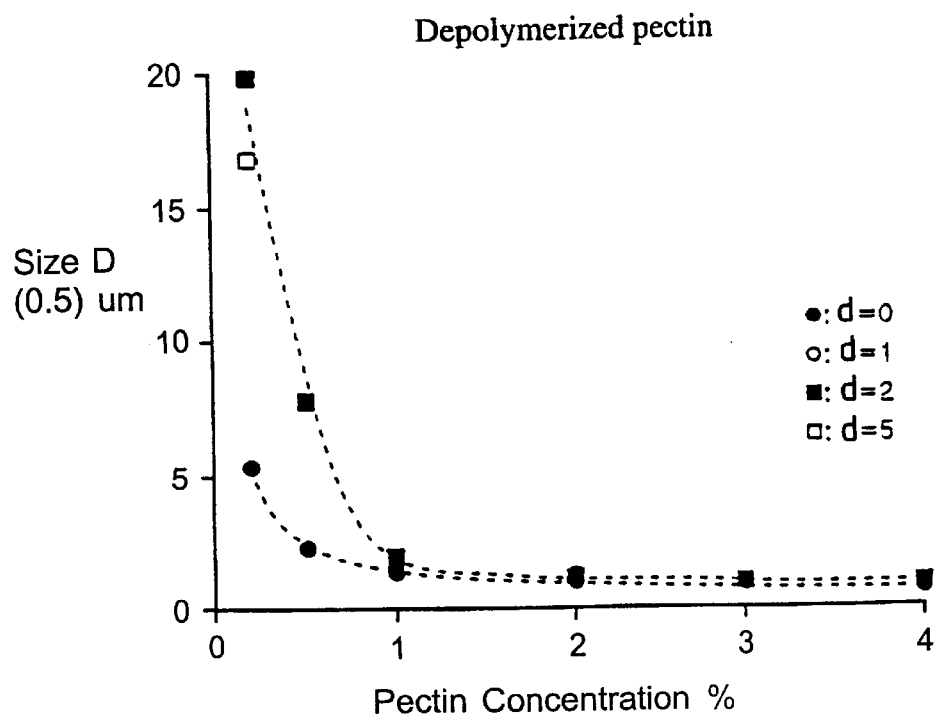
FIG. 3B is a plot of globular size as a function of concentration of depolymerized pectin.

The mean size (D 0.5) of the globules of essential orange oil was also measured as a function of the pectin concentration and as a function of time in an emulsion for soft drink. The results obtained are given on the graphs of FIGS. 3a and 3b; FIG. 3a gives the size of the globules as a function of the concentration of non-depolymerized pectin and FIG. 3b gives the size of the globules as a function of the concentration of depolymerized pectin obtained according to Example 1A.

EXAMPLE 3

Stabilization of Emulsions for Soft Drinks and Soft Drinks

The natural emulsifiers currently used for the manufacture of emulsions for soft drinks and soft drinks are mainly 2 types of polysaccharides: gum arabic and base emulsion gum known under the tradename "Emulgum" and marketed by CNI (Colloïdes Naturels IRANEX). The latter gum possesses very valuable intrinsic emulsifying properties, compared with those of gum arabic, at appreciably lower use doses. The properties of the base emulsion gum were compared with those of the citrus pectin of Example 1A) (the non-depolymerized pectins imparted too much viscosity and were not tested).

The base emulsion gum used in this Example is a combination of different kinds of acacia exudate and is in the form of a white powder; the viscosity of a 5% aqueous solution of said gum, measured at 20° C. after agitation for 30 min with a BROOKFEELD LVF viscometer at 60 rpm, is 120–160 cps.

The soft drinks were made by mixing, with vigorous agitation (5000 rpm for 1 minute), an aqueous phase containing the emulsifier, sodium benzoate and citric acid, and an oily phase containing the essential oil and Damar gum (see composition in Table III below); this pre-emulsion was then homogenized by 3 passes at 300 bar. This emulsion was checked by examination under an optical microscope; to pass the test, the globules of essential oil must have a diameter of the order of 1 μm.

TABLE III

| Test | Control | 1 | 2 | 3 | 4 |
|---|---|---|---|---|---|
| Base emulsion gum | 50 | — | — | — | — |
| Pectin of Example 1A) | — | 20 | 30 | 40 | 50 |
| Sodium benzoate | 1 | 1 | 1 | 1 | 1 |
| Citric acid | 10 | 10 | 10 | 10 | 10 |
| Damar gum | 45 | 45 | 45 | 45 | 45 |
| Orange Brazil HE | 50 | 50 | 50 | 50 | 50 |
| Water | 866 | 866 | 866 | 866 | 866 |
| % w/v of emulsifier | 5 | 2 | 3 | 4 | 5 |

The microscopic control showed that all the emulsions are excellent, more especially as the pectin concentration is high.

The emulsions were tested in soft drinks according to the following formulation:

Emulsion (for soft drink): 1.6 g

Citric acid monohydrate: 3 g

Sucrose: 100 g

Carbonated water: qsp for 1 l

All the drinks showed a remarkable stability: absence of a ring around the neck, good homogeneity of the soft drink (no decantation gradient), turbidity identical to the control.

EXAMPLE 4

Atomized Flavorings

In this Example the properties of the depolymerized citrus pectin according to Example 1A) were compared with those of base emulsion gum and base pectin in the context of the atomization of flavorings.

The emulsion was made by mixing an aqueous phase containing the maltodextrin carrier, the gum and the pectin, and an oily phase containing the essential oil. The oily phase was added slowly to the aqueous phase, with slow agitation, and the mixture was then agitated vigorously at 10,000 rpm for 1 minute, after which it was passed through a homogenizer at 250 bar. The resulting emulsion was dried in an atomizer of the "Niro Production" type with an inlet temperature of 180° C. and an outlet temperature of 90° C. The degree of flavoring retention is measured on the resulting powder after extraction of the essential oil in a Florentine receiver. It is defined as follows:

$$\text{Retention} = \frac{\text{VOL recovered}}{\text{VOL introduced}} \times 100$$

The results are shown in Table IV below:

TABLE IV

| Essential oil | Gum arabic | Base emulsion gum | Malto-dextrin | Pectin of Example 1A) | Base pectin | Water | Retention |
|---|---|---|---|---|---|---|---|
| 75 | — | — | 425 | — | — | 635 | 61 |
| 75 | — | — | 420.75 | — | 4.25 | 635 | 61.9 |
| 75 | — | — | 403.75 | — | 21.25 | 635 | 71.5 |
| 75 | — | 4.25 | 420.75 | — | — | 635 | 73 |
| 75 | — | 21.25 | 403.75 | — | — | 635 | 73 |
| 75 | — | — | 420.75 | 4.25 | — | 635 | 72.6 |
| 75 | — | — | 414.4 | 10.6 | — | 635 | 85 |
| 75 | — | — | 403.75 | 21.25 | — | 635 | 90 |
| 75 | 85 | — | 340 | — | — | 635 | 91 |
| 75 | 127.5 | — | 297.50 | — | — | 635 | 91.5 |
| 75 | 123.5 | 4.25 | 297.50 | — | — | 635 | 94 |
| 75 | 123.5 | — | 297.50 | 4.25 | — | 635 | 96.9 |
| 75 | 425 | — | — | — | — | 900 | 99 |

Figure 4:
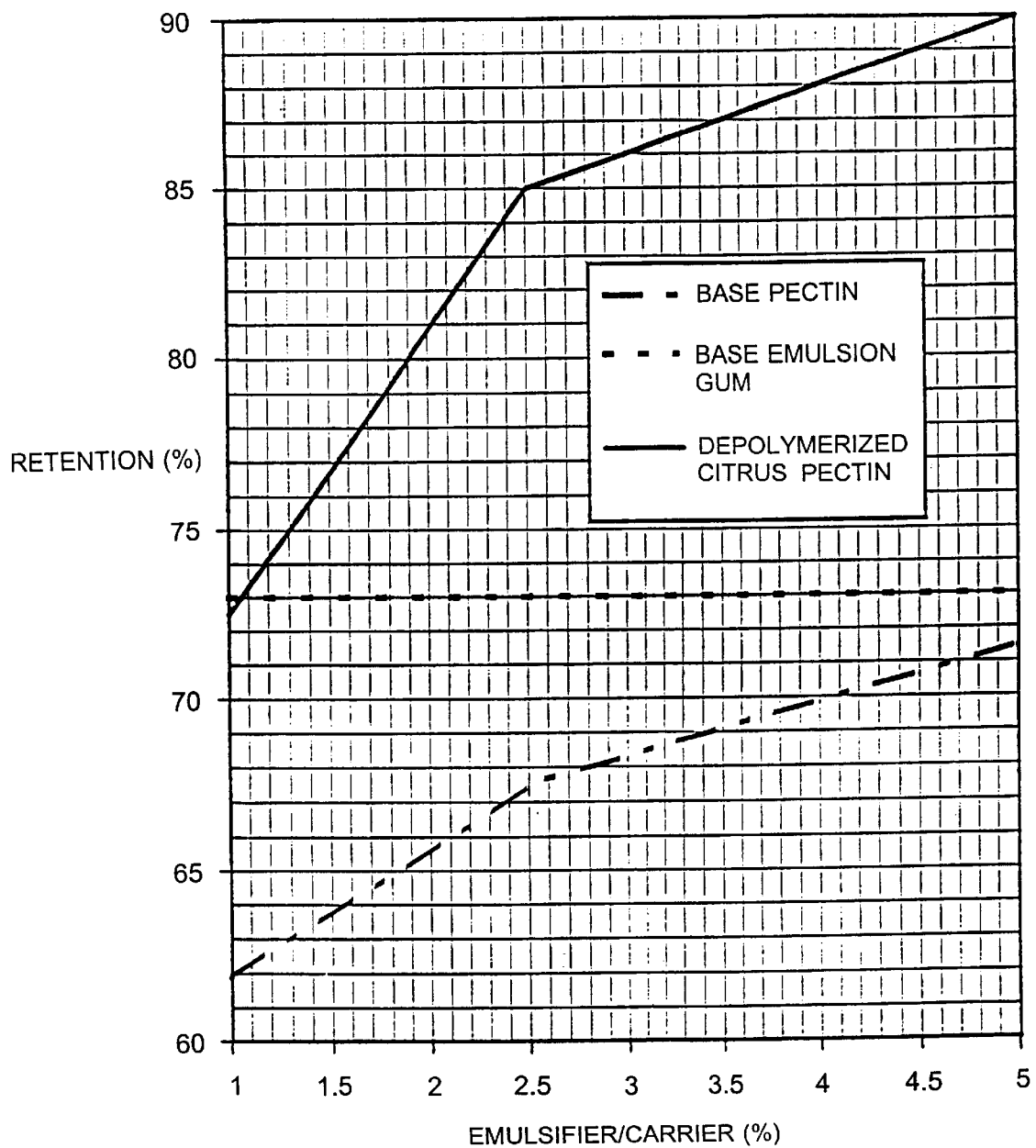
FIG. 4 is a plot of degree of retention as a function of emulsifier relative to the carrier, illustrating the results in Table IV.

The graph of FIG. 4, which gives the degree of retention (ordinate) as a function of % of emulsifier relative to the carrier (abscissa), illustrates the results of Table IV and demonstrates the good performance characteristics of depolymerized citrus pectin.

What is claimed is:

1. A method of preparing a stable oil-in-water emulsion, the method comprising
   adding an amount of a depolymerized citrus fruit or apple pectin to an oil-in-water polyphase, system, and
   mixing the oil-in-water polyphase system to form said emulsion, wherein the amount of the depolymerized pectin is sufficient to emulsify the oil-in-water polyphase system.

2. A method of claim 1, wherein the depolymerized citrus fruit or apple pectin has a molecular weight of less than 80,000.

3. A method of claim 2, wherein the depolymerized citrus fruit or apple pectin has a molecular weight from about 10,000 to 50,000.

4. A method of claim 1, wherein the depolymerized citrus fruit or apple pectin has a viscosity of less than 80 cps in a 2% aqueous solution when measured at 25° C. with a Brookfield viscometer.

5. A method of claim 4, wherein the viscosity is from 5 cps to 50 cps.

6. A method of claim 5, wherein the viscosity is from 5 cps to 20 cps.

7. A method for obtaining a food emulsion, the method comprising
   adding an amount of a depolymerized citrus fruit or apple pectin as an emulsifier to a food product, and
   mixing the food product to form the food emulsion, wherein the amount of the depolymerized pectin is sufficient to emulsify the food product.

8. The method of claim 7, wherein the depolymerized citrus fruit or apple pectin has a molecular weight of less than 80,000.

9. The method of claim 8, wherein the depolymerized citrus fruit or apple pectin has a molecular weight from about 10,000 to 50,000.

10. The method of claim 7, wherein the depolymerized citrus fruit or apple pectin has a viscosity of less than 80 cps in a 2% aqueous solution when measured at 25° C. with a Brookfield viscometer.

11. The method of claim 10, wherein the viscosity is from 5 cps to 50 cps.

12. The method of claim 11, wherein the viscosity is from 5 cps to 20 cps.

* * * * *